United States Patent [19]

Hatfield et al.

[11] Patent Number: 5,208,049
[45] Date of Patent: May 4, 1993

[54] CARRIAGE-MOUNTED EXTRUDER AND BLOW MOLDING HEAD

[75] Inventors: David Hatfield, Cincinnati; Richard Frazier, Milford, both of Ohio

[73] Assignee: Cincinnati Milacron Inc., Cincinnati, Ohio

[21] Appl. No.: 820,241

[22] Filed: Jan. 14, 1992

[51] Int. Cl.⁵ .................................................. B29C 49/04
[52] U.S. Cl. ..................................... 425/185; 425/190; 425/522; 425/532
[58] Field of Search ............... 425/522, 532, 539, 540, 425/185, 186, 190, 192 R

[56] References Cited

U.S. PATENT DOCUMENTS

| | | | |
|---|---|---|---|
| 3,355,763 | 12/1967 | Willert | 425/532 |
| 3,491,404 | 1/1970 | Mehnert | 425/531 |
| 3,632,267 | 1/1972 | Kader | 425/540 X |
| 3,837,780 | 9/1974 | Strong | 425/297 |
| 4,022,561 | 5/1977 | Strong | 425/532 |
| 4,239,474 | 12/1980 | Nakagawa | 425/540 X |
| 4,569,651 | 2/1986 | Krall | 425/532 |
| 4,738,612 | 4/1988 | Kikuchi et al. | 425/532 |
| 5,030,083 | 7/1991 | Kohno et al. | 425/532 |

Primary Examiner—Richard L. Chiesa
Attorney, Agent, or Firm—Nies, Kurz, Bergert & Tamburro

[57] ABSTRACT

An extrusion blow molding machine including an extruder and an extrusion die head, the extruder and extrusion die head carried on a carriage member. The carriage member is movable linearly along an extruder support frame of generally rectangular configuration, the extruder support frame extending laterally outwardly beyond a supporting mold clamp support frame that is adapted to support a movable blow mold. The carriage is shiftable in a horizontal direction so that the extrusion head can be selectively positioned above the blow mold when in an operating position, and can be shifted laterally outwardly in one direction to be positioned beyond the mold clamp support frame when in an inoperative position, to provide convenient access to the extrusion head from below for purposes of maintenance, cleaning, and the like. Shifting the carriage in the opposite direction causes both the extruder and the extrusion head to be positioned laterally relative to the blow mold to provide convenient access to the blow mold from above.

13 Claims, 4 Drawing Sheets

CARRIAGE-MOUNTED EXTRUDER AND BLOW MOLDING HEAD

BACKGROUND OF THE INVENTION

1. Field of the Invention

The present invention relates to blow molding machines of the extrusion-blow type, and more particularly to an extrusion-blow-type blow molding machine in which the extruder and the extrusion head are mounted on a carriage for movement toward and away from a molding station to permit improved access to the extruder, to the extrusion head, and to the blow molds.

2. Description of the Related Art

Extrusion blow molding machines generally include a horizontally-disposed extruder having a rotatable screw positioned within a tubular barrel. Plastics material in pelletized or particulate form is introduced into the barrel at one end thereof and is carried by the screw along the barrel to an outlet end. As the material is transported within the barrel it is mechanically worked to increase its temperature, thereby softening the material. External heat is also applied to the barrel to accelerate the softening process so that the originally discrete particles or pellets combine to form a viscous mass that can be continuously extruded through an extrusion die.

After the particulate material has been sufficiently heated and the particles have coalesced into a coherent, viscous mass, the heated, viscous material is forced through the extruder outlet to a suitable extrusion head, which includes the extrusion die, for extruding a tubular length of heated plastic material called a parison. The parison can be of either uniform or variable cross section, depending upon the type and shape of article to be blow molded.

The extrusion head is generally positioned above a horizontally separable, cooled blow mold so that the extrusion die opening is located above and between the halves of the blow mold when the mold is open. As the parison issues vertically downwardly from the extrusion head it is positioned between the two mold halves, which together define a cavity in the shape of the article to be blown.

The molds are closed about the parison with the upper and lower portions of the molds clamping the parison. Pressurized air is introduced into the parison, to blow the parison outwardly and expand it so that it contacts the interior surfaces of the mold to cool and thereby provide a thin-wall, hollow article, such as a container, or the like.

When access is required to the extrusion head for maintenance, cleaning, or perhaps for the substitution of one extrusion head for another, it is often inconvenient to service the machine because the extrusion head is not easily accessible. Either the head is in a fixed position above the molds and the mold clamping and blowing station, with the associated mold hardware impeding access to the extrusion head and extruder outlet, or, if the head is movable, its movement is limited to a point above another portion of the machine.

One approach that has been proposed to facilitate access to an extrusion head of a blow molding machine is disclosed in U.S. Pat. No. 3,491,404, which issued Jan. 27, 1970, to Gottfried Mehnert. The blow molding machine described in that patent includes a horizontally positioned rail along which the extrusion head can be carried by means of a trolley arrangement that rides along the rail. However, the axis of the extruder is perpendicular to the vertical plane in which the rail axis lies, and thus disconnection of the extruder head from the extruder is required in order to effect servicing.

Another arrangement for shifting the position of an extrusion head is disclosed in U.S. Pat. No. 3,837,780, which issued on Sep. 24, 1974, to Paul G. Strong. However, the Strong device contemplates shifting movement of an extrusion head between each of two side-by-side molds but within the confines of a generally rectangular machine frame.

It is an object of the present invention to overcome the deficiencies of the prior art devices, and to provide an improved extrusion blow molding machine wherein unimpeded access to the extrusion head is facilitated for cleaning and servicing.

It is another object of the present invention to provide an extrusion blow molding machine in which the extruder and extrusion head are carried for joint movement along the frame to and from respective servicing positions.

SUMMARY OF THE INVENTION

Briefly stated, in accordance with one aspect of the present invention, a supporting frame is provided for an extrusion blow molding machine. The supporting frame includes a mold clamp support frame for supporting a movable blow mold, the mold clamp support frame having a pair of spaced, substantially vertical ends between which a blow mold and blow mold actuation mechanism are supported.

An extruder support frame is carried by the mold clamp support frame and is positioned above the blow mold supported in the mold clamp support frame. The extruder support frame extends laterally outwardly from the mold clamp support frame in each of two directions.

A carriage is movable along the extruder support frame for supporting an extruder and an extrusion head positioned at an outlet from extruder to receive extruded material from the extruder and to provide a tubular parison of extruded material. The extruder support frame extends laterally beyond each of the ends of the mold clamp support frame to permit the carriage and extrusion head to be movable laterally beyond each of the vertical ends of the mold clamp support frame.

An actuator mechanism is provided for shifting the extruder carriage in a first direction of movement along the extruder support frame between a first position at which the extruder and extruder head are each positioned laterally outwardly relative to the mold clamp support frame to permit access to the mold, and a second position at which the extruder head is spaced laterally outwardly of the mold clamp support frame for convenient access to the extrusion head.

DESCRIPTION OF THE PREFERRED EMBODIMENTS

Figure 1:
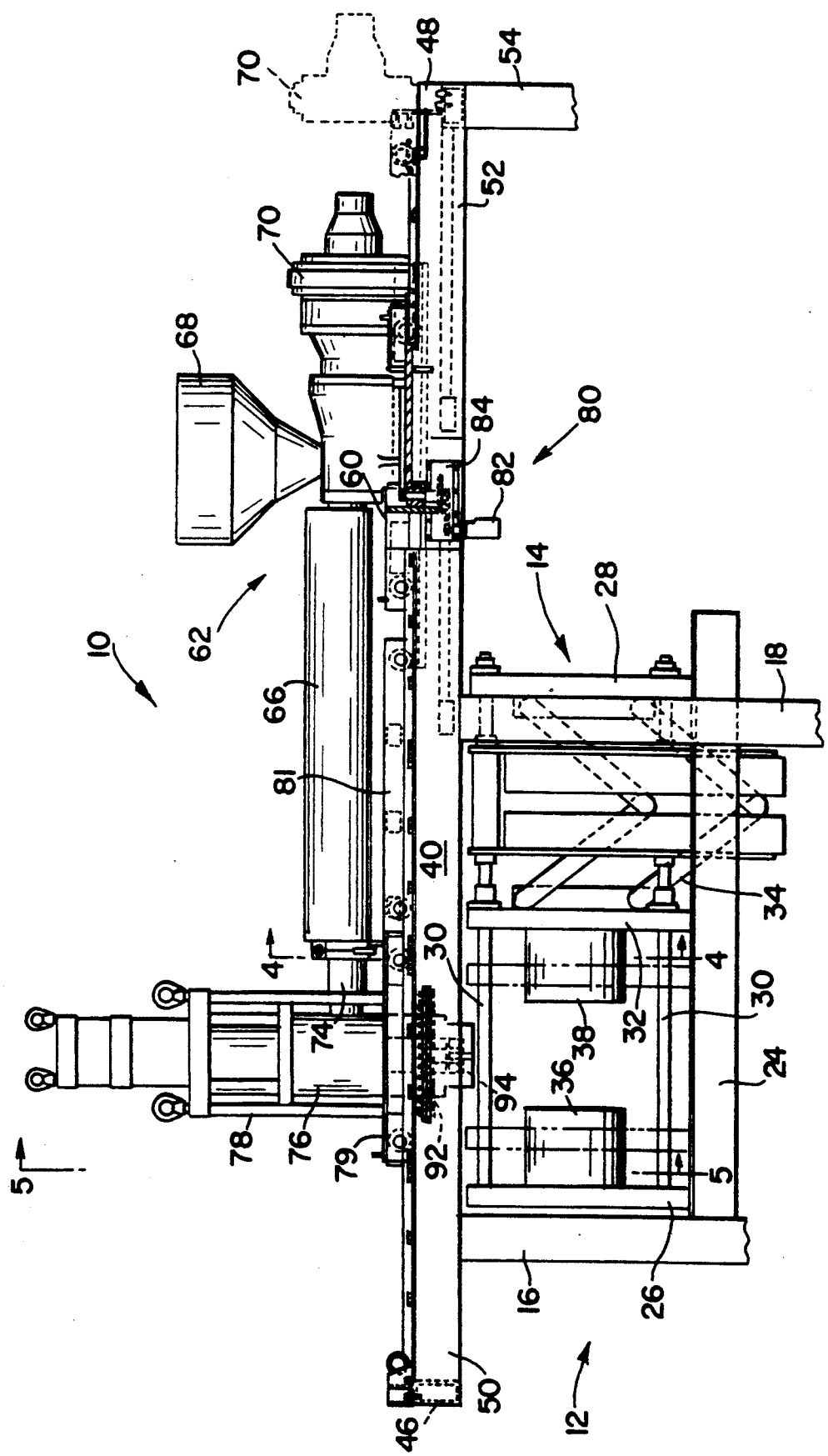
FIG. 1 is a side elevational view of an extrusion blow molding machine in accordance with the present invention.
Figure 2:
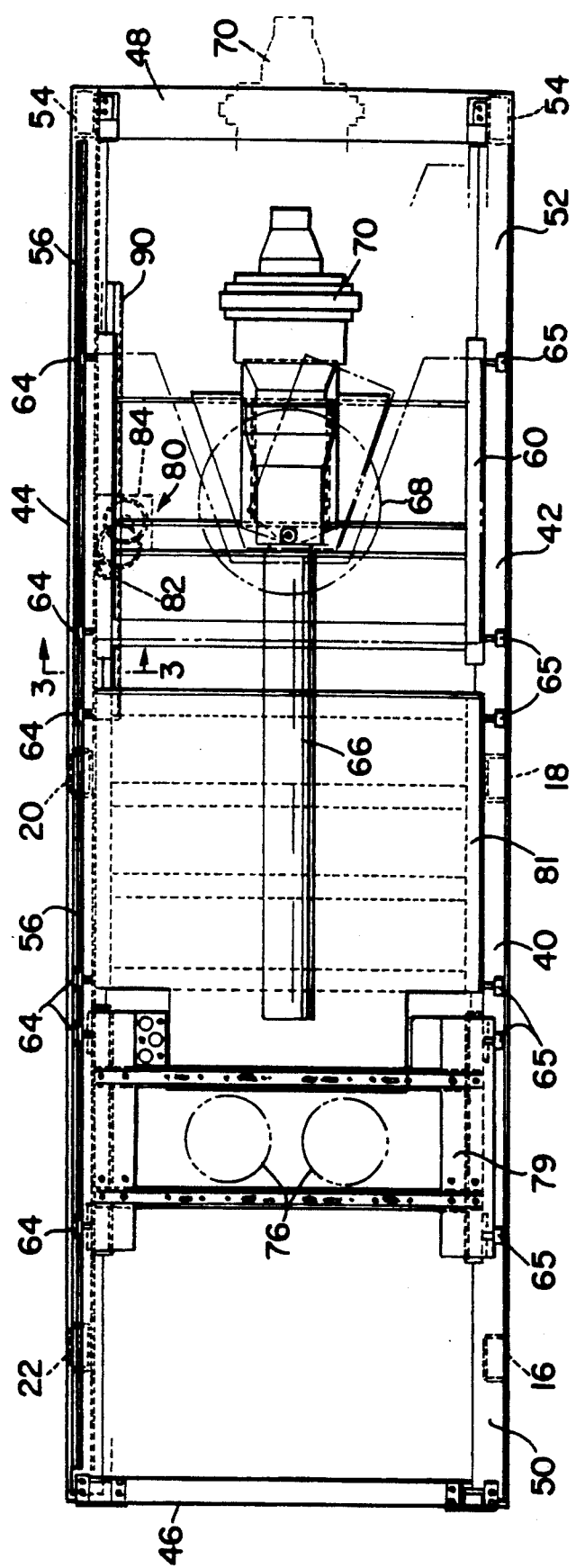
FIG. 2 is a top view of the blow molding machine shown in FIG. 1.

Referring now to the drawings, and particularly to FIGS. 1 and 2 thereof, there is shown an extrusion blow molding machine 10 in which a generally rectangular base frame 12, or mold support frame, is provided for supporting a mold clamping system 14 that includes a split blow mold and mold actuating apparatus.

Mold support frame 12 includes four parallel, vertically extending support members 16, 18, 20, and 22, each arranged to define a rectangular array. Four intermediate, horizontal support members 24 (only one of which is visible in FIG. 1) extend between the respective vertical support members. Horizontal support members 24 include two parallel side support members and two parallel end support members, the end support members disposed perpendicularly to the side support members.

The side and end horizontal support members 24 define a rectangular structure for supporting mold clamping system 14, which includes a pair of spaced, end platen members 26, 28, and an intermediate platen member 32. End platen members 26 and 28 are interconnected by four horizontally extending, cylindrical tie bars 30 that are disposed with their axes in parallel to define a rectangular array. Platen members 26 and 28 are positioned in fixed relationship to each other and are movable together to permit proper positioning of a blow mold relative to a parison extrusion head.

Intermediate platen 32 is guided for movement along support rods 30 and is connected with platen 28 by means of a toggle link arrangement 34. The toggle links can be moved by a vertically acting hydraulic cylinder (not shown) in a conventional manner. Actuation of the toggle links causes platen 32 to slide along tie rods 30 and causes platens 26 and 28 to move as a unit in the direction of the longitudinal axes of tie rods 30. Thus, when an upwardly directed actuation force (as viewed in FIG. 1) is applied to the toggle links, platens 26 and 32 are moved toward each other, and when a downwardly directed actuation force is applied to the toggle links, platens 26 and 32 are moved away from each other.

A blow mold is provided in the form of two split mold halves 36, 38. Mold half 36 is secured to platen 26 and mold half 38 is secured to platen 32, so that the respective mold halves can be selectively moved toward and away from each other by actuation of the hydraulic cylinder and toggle link arrangement, to close and open a mold cavity defined by opposed recesses in each of mold halves 36 and 38

Supported at the upper ends of the vertical members 16, 18, 20, and 22 of mold support frame 12 is a horizontally extending, rectangular extruder support frame 40. As best seen in FIG. 2, support frame 40 includes a pair of horizontally disposed, parallel, spaced side members 42, 44, and a pair of horizontally disposed, parallel, spaced end members 46, 48. Side members 42 and 44 are spaced from each other substantially the same distance as are corresponding pairs of vertical members 16, 22, and 18, 20 of mold support frame 12.

End members 46, 48 of extruder support frame 40 are each positioned laterally outwardly beyond corresponding vertical members 16, 22, and 18, 20 of mold support frame 12, to provide a first overhang portion 50 extending laterally outwardly beyond one end of mold support frame 12, and a second overhang portion 52 extending laterally outwardly beyond the opposite end of mold support frame 12.

As is evident in FIG. 1, overhang portion 52 is substantially longer than overhang portion 50. If desired, or if necessary based upon the weight of the machine, one or more vertical supports 54 can be connected with extruder frame 40 at or near the outermost end of overhang portion 52 to provide additional vertical support.

Figure 3:
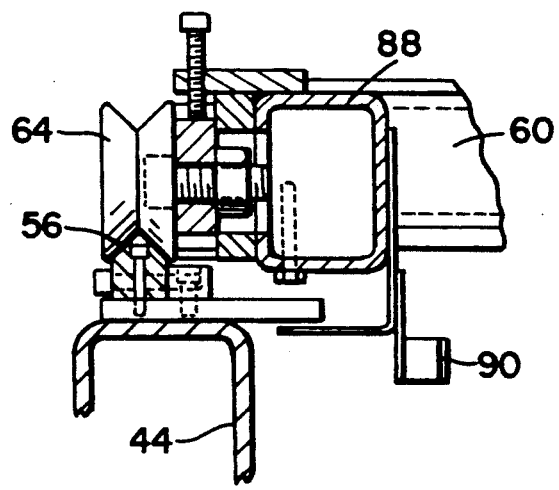
FIG. 3 is a fragmentary cross-sectional view taken along the line 3—3 of FIG. 2.
Figure 4:
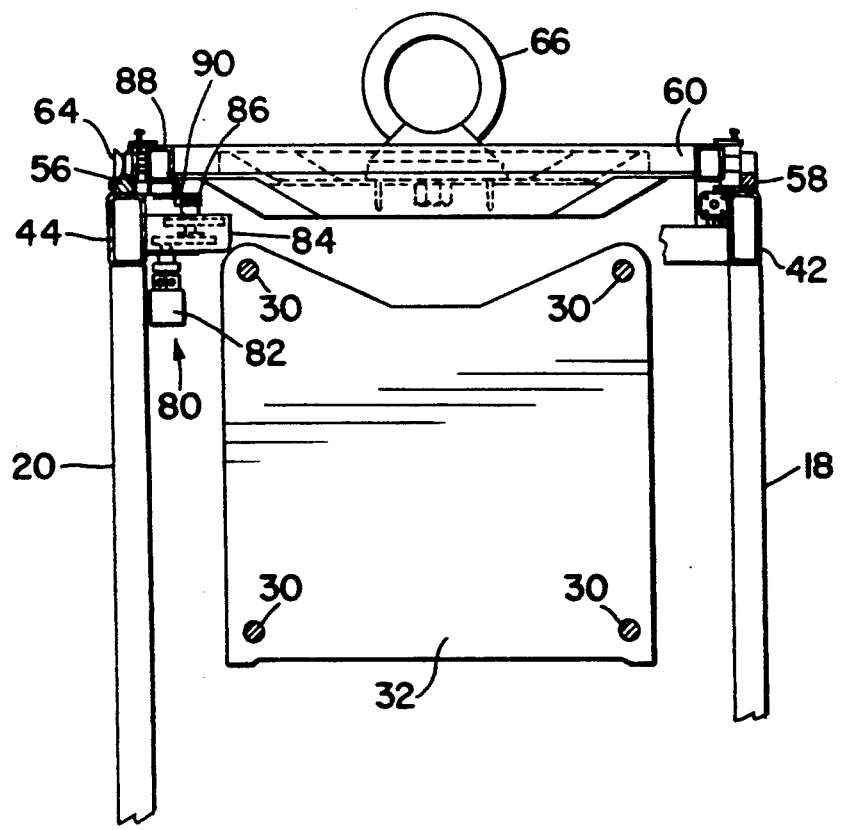
FIG. 4 is a fragmentary cross-sectional view taken along the line 4—4 of FIG. 1.
Figure 5:
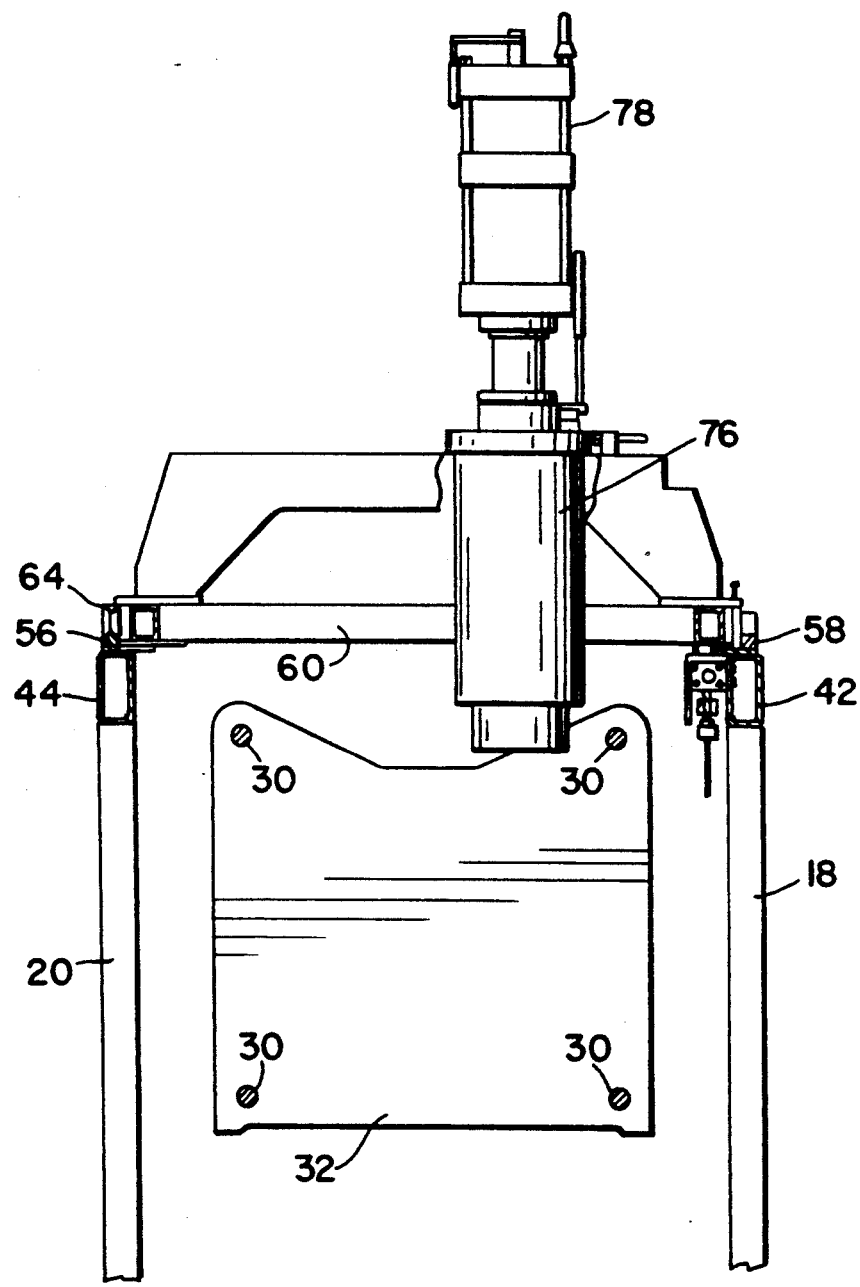
FIG. 5 is a fragmentary cross-sectional view taken along the line 5—5 of FIG. 1.

As best seen in FIG. 3, extruder support frame 40 includes a first track member 56 that is carried on and extends along the upper surface of side member 44. Track member 56 has a non-planar surface, such as V-shaped cross section shown in FIG. 3. Opposite side member 42 of extruder support frame 40 can have a similar track member extending therealong or, alternatively, and as shown in FIGS. 4 and 5, it can instead have a flat surface track member 58.

A generally rectangular extruder carriage 60 is provided as shown in FIG. 1 to support an extruder 62. As best seen in FIG. 2, carriage 60 includes a plurality of peripherally grooved wheels 64 that are positioned along one side of carriage 60. Wheels 64 each have a V-shaped, recessed peripheral groove that is adapted to engage with and to ride on V-shaped linear track 56 carried by extruder support frame 40. Similarly, wheels 65 positioned along the opposite side of carriage 60 from wheels 64 are adapted to ride on the upper surface of side member 42. Thus, extruder carriage 60 is adapted to ride on and be movable linearly along the upper longitudinal surfaces of rectangular extruder support frame 40.

Extruder 62 includes a longitudinally extending tubular barrel 66 that rotatably carries an extruder screw (not shown). A material hopper 68 is supported by and extends upwardly from an inlet section of extruder 62, to permit flow of pelletized or particulate plastics material from within hopper 68 into extruder barrel 66. An extruder drive motor 70 is provided at an end of barrel 66 and is also supported by carriage 60. Drive motor 70 is directly connected with and rotates the extruder screw.

The forward end of extruder barrel 66 (the left end as viewed in FIGS. 1 and 2) includes an outlet member 74 that communicates with an extrusion head 76. An outlet (not shown) is provided on a downwardly facing surface of extrusion head 76 to extrude in a downward direction a tubular parison of heated plastics material. Extrusion head 76 can be of conventional construction, the structural details of which are familiar to those skilled in the art. Moreover, as will be appreciated by those skilled in the art, more than one extrusion head 76 can be provided, as shown in FIG. 2, in order to permit the simultaneous extrusion of more than one parison and the subsequent simultaneous blowing of more than one article.

Extrusion head 76 is, in turn, supported by an extrusion head frame 78 that is carried on and secured to an extrusion head carriage 79 to support extrusion head 76 so that its longitudinal axis is substantially vertical and the extrusion outlet (not shown) opens downwardly. Carriage 79 includes a plurality of wheels 64 and 65, having the same structure as the corresponding wheels on carriage 60, to permit extrusion head carriage 79 to move along side members 42 and 44 of support frame 40.

As shown in FIG. 2, extrusion head frame 78 carries a pair of laterally spaced extrusion heads 76, each of which is fed by a single extruder through a suitable flow divider. However, it will be understood that a similar structural arrangement having but a single extrusion head can also be employed.

Positioned between extruder carriage 60 and extrusion head carriage 79 is an intermediate or platform carriage 81 that interconnects carriages 60 and 79 through suitable couplings and that defines a platform surface to permit servicing of extruder 62 or of extrusion head 76 as necessary. Platform carriage 81 also includes a plurality of wheels 64 and 65 to permit carriage 81 to move along side members 42 and 44 of support frame 40.

Referring now to FIGS. 1 and 4, a carriage drive system 80 is provided for movement of carriages 60, 79, and 81 longitudinally along extruder support frame 40. Drive system 80 is supported by extruder support frame 40 and includes a carriage drive motor 82 and a reduction gear box 84, which turns an output drive pinion 86 about a vertical axis of rotation. Reduction gear box 84 is secured to extruder support frame 40 and supports carriage drive motor 82, which depends downwardly from reduction gear box 84.

As best seen in FIG. 3, positioned along the inwardly facing surface of longitudinal side panel member 88 of carriage 60 is a horizontally extending rack 90 that is positioned to be engaged by drive pinion 86 so that rotation of pinion 86 by carriage drive motor 82 operating through reduction gear box 84 drives rack 90 and attached carriage 60 to move in a longitudinal direction along and relative to extruder support frame 40. Although shown as positioned on only one inner side of carriage 60, it will be apparent that a similar carriage drive mechanism can be provided on the opposite side of carriage 60, if desired, depending upon the size of the extruder and the required power output to move carriage 60. Additionally, instead of the rack and pinion arrangement shown, the carriage drive mechanism can instead be a ball screw and ball nut arrangement in which a ball screw is supported by the carriage and a ball nut and drive motor are supported by the extruder support frame. Of course, other drive arrangements can also be employed, as will be appreciated by those skilled in the art.

Although a unitary carriage can be provided, if desired, to support and carry extruder 62 and extrusion head 76, thereby combining into a single carriage each of carriages 60, 79, and 81, a multiple carriage assembly as illustrated and described is preferred.

Referring once again to FIG. 1, the position of extrusion head 76 can be adjusted in a direction along extruder support frame 40 by means of a threaded rod 92, the respective ends of which are carried by and secured to extruder support frame 40. A rotatable adjustment nut 94 is carried on rod 92, and rotation of nut 94 shifts extrusion head 76 relative to the mold cavity defined by molds 36 and 38. A suitable locking mechanism (not shown) can be provided to lock extrusion head 76 in a desired lateral position relative to molds 36 and 38.

In operation, when the blow molding machine is intended to be in its operative condition for extruding material to be blow molded, the several parts of the apparatus are in the positions shown in solid lines in FIG. 1, in which extrusion head 76 is positioned above molds 36 and 38, which are initially spaced from each other so that a parison that is extruded from extrusion head 76 descends between the spaced molds. The molds are then brought together by mold clamping mechanism 14, to enclose the parison therebetween for subsequent blowing into a predetermined form defined by the configuration of the mold cavity. Carriages 60, 79, and 81 can be held in position by the rack and reduction gear arrangement by virtue of the fact that drive motor 82 is stopped.

When access to extrusion head 76 is desired, such as for maintenance, repair, cleaning, or the like, carriage drive motor 82 is energized to cause carriages 60, 79, and 81 to move in a leftward direction, as viewed in FIG. 1, so that each of the carriages shift to the left and extrusion head 76 is positioned leftward and outwardly of vertical support 16 of mold clamp support frame 12 at first overhang portion 50. Extrusion head 76 is then exposed for easy access from below. Repairs, cleaning, and substitution of another extrusion head can be readily accomplished.

When the repair, cleaning, or substitution operation has been completed, carriage drive motor 82 is energized to cause carriages 60, 79, and 81 to move to the right, as viewed in FIG. 1, so that extrusion head 76 is once again positioned directly above mold halves 36 and 38 when they are in contact with each other.

Movement of extruder carriage 60 to the extreme right by carriage drive motor 82, to a position along extruder support frame 40 at which extruder drive motor 70 is in the position shown in dashed lines in FIGS. 1 and 2, causes extrusion head 76 to be shifted to the right of the area in which mold halves 36 and 38 are positioned, to thereby expose the mold area to access from above. Consequently, the mold halves can easily be repaired, replaced, or cleaned, as necessary, without the impediment of extrusion head 76 blocking easy access to the mold area from above.

It will thus be seen that the present invention provides distinct advantages over the prior art devices in that shifting of the extruder and extrusion head can be readily accomplished, and the extrusion head can be placed in a position for convenient access to the head and also for convenient access to the blow molds.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A supporting frame for a blow molding machine, said frame comprising:
   a) a mold clamp support frame for supporting a movable blow mold, the mold clamp support frame having a pair of spaced, substantially vertical end members positioned to support between the substantially vertical ends a blow mold and a blow mold actuation mechanism for imparting movement to at least one of the molds to move the molds relative to and in a direction toward and away from each other;
   b) an extruder support frame carried by the mold clamp support frame and positioned above the blow mold supported in the mold clamp support frame, the extruder support frame extending laterally outwardly from the mold clamp support frame in two directions;
   c) a carriage movable along the extruder support frame for carrying an extruder and an extrusion head that is positioned at an outlet from the extruder to receive extruded material from the extruder and to provide a tubular parison of extruded material, the carriage being movable laterally relative to the mold clamp support frame and along the extruder support frame between a first position at which the carriage is laterally outward of the mold clamp support frame on one side of the mold clamp support frame and a second position at which the carriage is laterally outward of the mold clamp support frame on an opposite side of the mold clamp support frame; and d) an actuator for shifting the extruder carriage in a first direction of movement along the extruder support frame between a first position at which the extruder and extruder head are each positioned laterally outwardly relative to the molds to permit access to the molds, and a second position at which the extrusion head is spaced laterally outwardly of the mold clamp support frame for convenient access to the extrusion head.

2. A supporting frame in accordance with claim 1 wherein the extruder support frame extends laterally beyond each of the lateral ends of the mold clamp support frame.

3. A supporting frame in accordance with claim 1 wherein the carriage includes a plurality of rotatable rollers that roll along the extruder support frame.

4. A supporting frame in accordance with claim 3 wherein the rollers on at least one side of the carriage are positively guided by the extruder support frame.

5. A supporting frame in accordance with claim 4 wherein the rollers and a track have cooperating guide surfaces.

6. A supporting frame in accordance with claim 5 wherein the track and rollers each have a V-shaped cooperative engagement.

7. A supporting frame in accordance with claim 1 wherein the actuator is carried by the extruder support frame.

8. A supporting frame in accordance with claim 7 wherein the actuator includes a drive motor having an output drive shaft, a reduction gear box connected with the motor output drive shaft and carrying an output drive pinion, and wherein the carriage includes a rack secured thereto and engagable with the drive pinion so that rotation of the drive motor causes linear movement of the carriage relative to the extruder support frame.

9. A supporting frame in accordance with claim 1 wherein the carriage includes a plurality of interconnected carriage members movable as a unit along the extruder support frame, and wherein a first carriage supports the extruder and a second carriage supports the extrusion head.

10. A supporting frame in accordance with claim 9 including a third carriage positioned between and interconnecting the first and second carriages.

11. In an extrusion blow molding machine including an extruder having an extrusion head, and a blow mold station below the extrusion head for supporting a separable blow mold, the improvement comprising:

a. a substantially rectangular frame for supporting the extruder and mold station so that the extrusion head is positioned to extrude a parison downwardly along a substantially vertical extrusion axis passing through the mold, and the mold station is supported below the extrusion head to receive the extruded parison; and b. a carriage mounted for movement along the frame for supporting the extruder and extrusion head for lateral movement relative to the extrusion axis in a first direction to a first position at which the extrusion head and extruder are displaced laterally of the extrusion axis to permit free access to the blow mold from above the mold, and movable in a second direction opposite from the first direction to a second position at which the extrusion head is displaced laterally of the extrusion axis and laterally of the machine frame to permit free access to the extrusion head from below the extrusion head, the frame extending laterally outwardly from the mold station in two opposite directions, the carriage being movable laterally relative to the mold station and along the frame between a first position at which the carriage is laterally outward of the mold station on one side of the mold station and a second position at which the carriage is laterally outward of the mold station on an opposite side of the mold station.

12. An extrusion blow molding machine in accordance with claim 11 wherein the carriage includes a plurality of interconnected carriage members movable as a unit along the frame, and wherein a first carriage supports the extruder and a second carriage supports the extrusion head.

13. An extrusion blow molding machine in accordance with claim 12 including a third carriage positioned between and interconnecting the first and second carriages.

* * * * *